(12) United States Patent
Gohil

(10) Patent No.: US 11,537,707 B1
(45) Date of Patent: Dec. 27, 2022

(54) SECURE IDENTITY BINDING

(71) Applicant: Amazon Technologies, Inc., Seattle, WA (US)

(72) Inventor: Chitranjan Gohil, Mission Viejo, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 224 days.

(21) Appl. No.: 16/585,901

(22) Filed: Sep. 27, 2019

(51) Int. Cl.
*G06F 21/45* (2013.01)
*G06F 21/31* (2013.01)

(52) U.S. Cl.
CPC .............. *G06F 21/45* (2013.01); *G06F 21/31* (2013.01)

(58) Field of Classification Search
CPC ..... G06F 21/45; G06F 21/31; H04L 63/0421; H04L 9/0637; H04L 9/3228; H04L 63/102; H04L 63/0876; G06Q 20/3678
See application file for complete search history.

(56) References Cited

U.S. PATENT DOCUMENTS

| | | | | |
|---|---|---|---|---|
| 6,055,637 | A * | 4/2000 | Hudson | G06F 21/6218 709/225 |
| 8,533,796 | B1 * | 9/2013 | Shenoy | H04L 63/0846 709/225 |
| 10,880,283 | B1 * | 12/2020 | Roth | G06F 21/604 |
| 2003/0229783 | A1 * | 12/2003 | Hardt | H04L 63/102 713/155 |
| 2004/0088349 | A1 * | 5/2004 | Beck | H04L 63/0407 709/203 |
| 2005/0208940 | A1 | 9/2005 | Takase et al. | |
| 2006/0026042 | A1 * | 2/2006 | Awaraji | H04L 63/10 705/3 |
| 2006/0116117 | A1 * | 6/2006 | Takase | H04L 63/0407 455/420 |
| 2007/0261114 | A1 | 11/2007 | Pomerantsev | |
| 2008/0162926 | A1 * | 7/2008 | Xiong | H04L 63/0892 713/155 |
| 2013/0019295 | A1 * | 1/2013 | Park | G06F 21/33 726/7 |

(Continued)

OTHER PUBLICATIONS

Kazunari et al.; "Identifier Migration in OpenID"; IEEE Fifth Int'l Conf. on Innovative Mobile and Internet Services in Ubiquitous Computing; 2011; p. 612-617.

*Primary Examiner* — Tongoc Tran
(74) *Attorney, Agent, or Firm* — BakerHostetler

(57) ABSTRACT

A first request is received for generation of a temporary alternate identifier for a user, wherein the user is identified within a service using a user service identifier, and wherein the temporary alternate identifier assists in binding the user service identifier with a resource identifier that identifies the user within a resource. The temporary alternate identifier is then generated and associated with the user service identifier. The temporary alternate identifier is then provided the user, and the temporary alternate identifier is also provided by the user to the resource. A second request is received, from the resource, for validation of the temporary alternate identifier. The user resource identifier is also received from the resource, for example as part of the second request. The user service identifier is then bound with the user resource identifier. Additionally, an indication is provided, to the resource, that the temporary alternate identifier is valid.

20 Claims, 9 Drawing Sheets

(56) References Cited

U.S. PATENT DOCUMENTS

| | | | |
|---|---|---|---|
| 2013/0103802 A1 | 4/2013 | Kawato | |
| 2013/0212699 A1* | 8/2013 | Pollard | G06F 16/273 |
| | | | 726/27 |
| 2014/0007198 A1* | 1/2014 | Durbha | H04L 63/102 |
| | | | 726/4 |
| 2014/0068746 A1* | 3/2014 | Gonzalez | G06F 21/335 |
| | | | 726/9 |
| 2015/0134827 A1* | 5/2015 | Shah | H04L 67/16 |
| | | | 709/226 |
| 2016/0006743 A1 | 1/2016 | Liu | |
| 2016/0063657 A1* | 3/2016 | Chen | H04L 63/0421 |
| | | | 705/325 |
| 2016/0132205 A1* | 5/2016 | Ramakrishnan | G06F 3/0486 |
| | | | 715/765 |
| 2019/0299100 A1 | 10/2019 | Horie | |
| 2019/0306128 A1 | 10/2019 | Kothavale et al. | |
| 2019/0372966 A1* | 12/2019 | Satija | H04L 45/308 |
| 2019/0378499 A1* | 12/2019 | Miller | G06F 3/167 |
| 2020/0252400 A1* | 8/2020 | Pike | H04L 63/0853 |
| 2020/0403994 A1* | 12/2020 | Bitterfeld | H04L 67/025 |
| 2021/0090578 A1* | 3/2021 | Trapp | H04W 76/15 |

* cited by examiner

SECURE IDENTITY BINDING

CROSS-REFERENCE TO RELATED APPLICATIONS

This application is related to the following application, which is hereby incorporated by reference in its entirety: U.S. patent application Ser. No. 16/585,777 filed Sep. 27, 2019, entitled "SECURE IDENTITY TRANSFER".

BACKGROUND

One common feature of modern computing applications is that users may typically have an identity associated with a particular computing service or resource. One example of this is in video game streaming applications, in which a particular user, referred to as streamer, may play a video game and broadcast video from the game for viewing by spectators. Specifically, the streamer may login to a video streaming service with an assigned service identifier, such as a username. The streamer may then provide video of the game to the video streaming service, which may in turn broadcast the video to its subscribers. The streamer may be identified to subscribers of the video streaming service using his assigned username or other service identifier. For example, a streamer may have a particular channel that subscribers may select to view video of the streamer playing games. In some cases, it may be advantageous for a user to transfer his identify from one service or resource to another. For example, a streamer may wish to join a video game and to be identified within the video game using his assigned username or other service identifier from the video streaming service. One reason for this is that a streamer may accumulate a large following of other users that enjoy watching the streamer play games and that identify the streamer via his service identifier. This type of identity transfer may, however, present various challenges. For example, it creates the potential for malicious users to attempt to join the video game and impersonate the streamer using the streamer's publicly known service identifier, thereby effectively stealing the streamer's identity.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
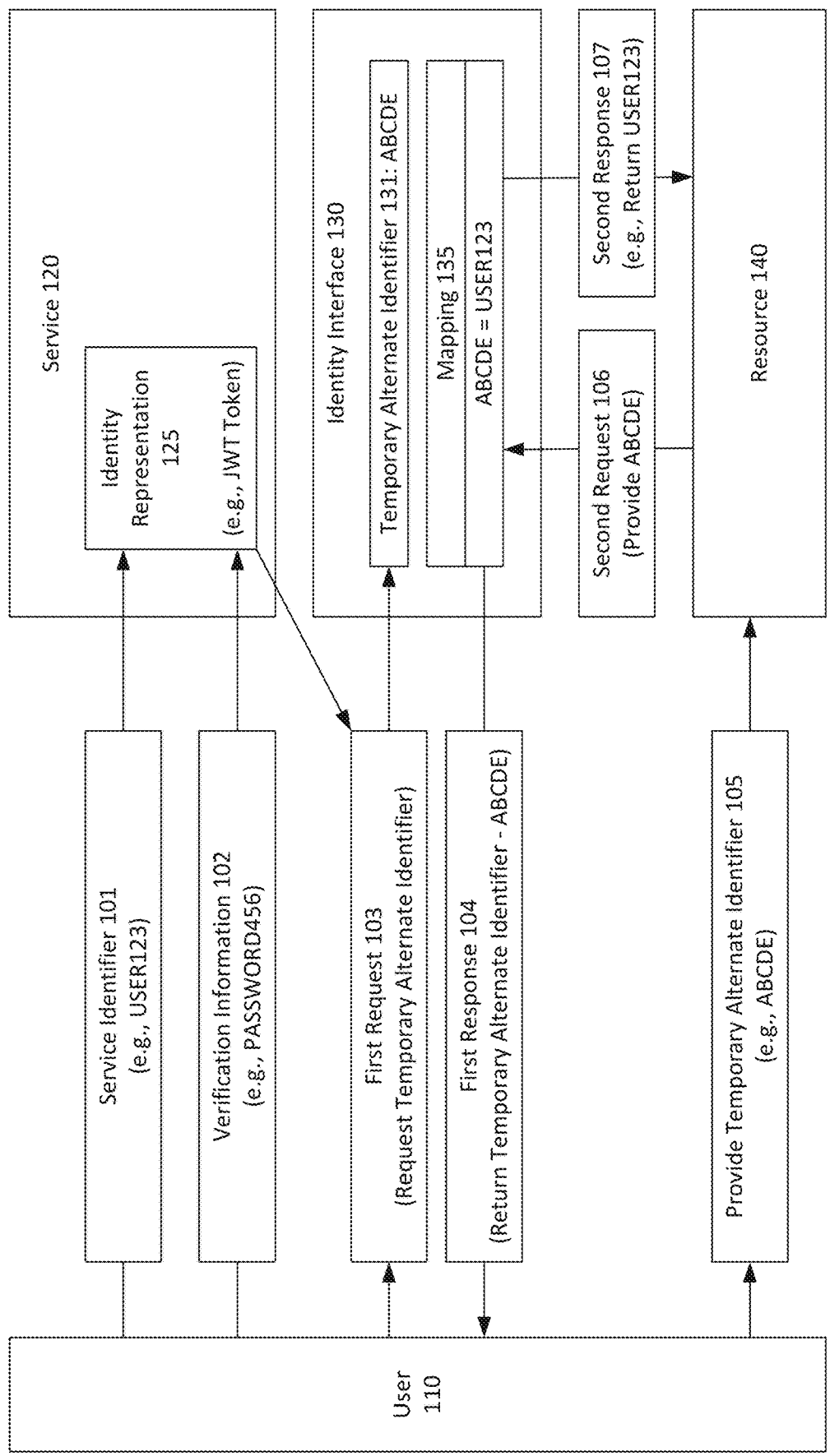
FIG. 1 is a diagram illustrating an example secure identity transfer system that may be used in accordance with the present disclosure.

Techniques for secure identity transfer are described herein. In some examples, a user may have a service identifier that identifies the user within the context of a service. For example, in some cases, the service identifier may be a username that is employed by the user to access the service. In one specific example, the service may be a video streaming service, and the user may be a streamer that provides video of himself playing various video games. The video may then be broadcast by the video streaming service to spectators, such as subscribers of the video streaming service, for example via the streamer's channel that is made available by the video streaming service. In some examples, the user may login to (or otherwise access) the service using the service identifier as well as verification information associated with the service identifier, such as a corresponding password or other verification information. For example, by matching the service identifier with the corresponding password or other verification information, the service may verify the identity of the user and ensure that the user is the individual that he purports to be. In some examples, when the user successfully logs into or otherwise accesses the service, the service may generate an identity representation for the user that represents the identity of the user. In one specific example, the identity representation may be a JavaScript Object Notation (JSON) Web Token (JWT token). In some examples, the use of JWT tokens as identity representations may be particularly advantageous because they may be particularly difficult to tamper with. However, it is noted that the identity representation may include other representations of the user's identify, such as the service identifier itself or other representations of the user's identity.

In some examples, the user may wish to transfer his identity from the service to a resource. This may allow the user to be identified within the context of the resource using the same identity (e.g., the service identifier) by which the user is identified within the context of the service. In one specific example, a streamer may wish to transfer his identity from a video streaming service to a particular video game. This may allow the streamer to be identified within the video game using the same identity (e.g., the video streaming service identifier) by which the streamer is identified within the video streaming service. One reason for this is that a streamer may accumulate a large following of other users that enjoy watching the streamer play games and that identify the streamer via his service identifier. As described in detail below, an identity interface may be provided to assist the user in transferring his identity from the service to the resource. In particular, in some examples, the user may issue a request to the identity interface to generate and provide a temporary alternate identifier to the user to enable secure transfer of the user's identity from the service to the resource. For example, in some cases, the user may issue a request to the identity interface that includes the user's identity representation (e.g., JWT token) generated by the service. The identity interface may then parse the identity representation to obtain the user's service identifier and generate a temporary alternate identifier that is temporarily associated with the user's service identifier. The identity interface may then provide the temporary alternate identifier to the user. In some examples, the identity interface may expose an application programming interface (API), such as a Representational State Transfer (REST) API, and the user may issue an API call to the identity interface to request the temporary alternate identifier from the identity interface. In some examples, the use of a REST API may be particularly advantageous, such as because REST API's may be called from code and may be called by a wide variety of applications and components.

Upon receipt of the temporary alternate identifier from the identity interface, the user may then access the resource and provide the temporary alternate identifier to the resource. The resource may then attempt to determine the identity of the user that provides the temporary alternate identifier to the resource. To make this determination, the resource may issue a request to the identity interface to provide the identity (e.g., the service identifier) associated with the temporary alternate identifier provided to the resource by the user. Specifically, the resource may issue an API call to the API of the identity interface that includes the temporary alternate identifier and that requests, in return, the service identifier that is associated with the temporary alternate identifier. The identify interface may then match the temporary alternate identifier received from the service with the user's service identifier that the identity interface has associated with the temporary alternate identifier. The identity interface may then issue a response to the resource that includes the user's service identifier. Upon receipt of the user's service identifier, the resource may then use the service identifier to refer to the user within the context of the resource, thereby allowing the user's identity to be securely transferred from the service to the resource. For example, if the resource is a video game, a character or other virtual entity controlled by the user may be identified using the user's service identifier.

It is noted that the techniques described above may provide a number of advantages over existing techniques. For example, by employing an alternate identifier, the user's identity may be protected against malicious users that may attempt to access the resource and impersonate the user. Additionally, the alternate identifier may be temporary (e.g., may only be valid for a limited period of time) in order to provide additional security to the user's identity. It is noted that some existing techniques may employ a protocol such as OAUTH to delegate access to user information. However, a protocol such as OAUTH may require the use of browser or other application or interface that supports the use of such a protocol, thereby effectively limiting the scenarios in which such a protocol may be used. Moreover, the use of such protocols may sometimes be technically difficult and/or error-prone to implement. It is also noted that some existing techniques may employ a one-time password as an authorization mechanism for a user. In these existing techniques, a user may enter a username and password—and a vendor may then send a one-time password over text or email. The user may then provide the one-time password as a second step (i.e., two-factor) authorization mechanism to successfully log into an application. However, these techniques are employed merely for purposes of authentication into a single platform—not for purposes of transferring a user's identity from one platform to another. By contrast, the techniques described herein allow a user to already be logged into one platform and to then allow the knowledge of that identity to be transferred to another platform.

FIG. 1 is a diagram illustrating an example secure identity transfer system that may be used in accordance with the present disclosure. As shown in FIG. 1, a user 110 may access a service 120. In one specific example, the service 120 may be a video streaming service, and the user 110 may be a streamer that provides video of himself playing various video games. The video may then be broadcast by the video streaming service to spectators, such as subscribers of the video streaming service, for example via the streamer's channel that is made available by the video streaming service. In the example of FIG. 1, the user 110 logs into service 120 by providing a service identifier 101 in combination with corresponding verification information 102. In some examples, the service identifier 101 may include a username, such as USER123. Also, in some examples, the verification information may include a password, such as PASSWORD456. The service identifier 101 may be a publicly known identifier by which the user 110 is publicly known, such as by which the user is known to other users of the service 120. For example, in some cases, a streamer's channel within a video streaming service may be identified using the streamer's respective service identifier 101. By contrast, the verification information 102 may include private information, such as may be known only to the user 110 and the service 120. By matching the service identifier 101 with the corresponding password or other verification information 102, the service 120 may verify the identity of the user 110 and ensure that the user 110 is the individual that he purports to be.

As shown in FIG. 1, when the user 110 successfully logs into or otherwise accesses the service 120, the service 120 may generate an identity representation 125 for the user 110 that represents the identity of the user 110. In one specific example, the identity representation 125 may be a JavaScript Object Notation (JSON) Web Token (JWT token). In some examples, the use of JWT tokens as identity representations may be particularly advantageous because they may be particularly difficult to tamper with. However, it is noted that the identity representation 125 may include other representations of the user's identify, such as the service identifier 101 itself or other representations of the user's identity.

In the example of FIG. 1, the user 110 wishes to transfer his identity from the service 120 to a resource 140. This may allow the user 110 to be identified within the context of the resource 140 using the same identity (e.g., the service identifier 101) by which the user 110 is identified within the context of the service 120. In one specific example, a streamer may wish to transfer his identity from a video streaming service to a particular video game. This may allow the streamer to be identified within the video game using the same identity (e.g., the video streaming service identifier) by which the streamer is identified within the video streaming service. One reason for this is that a streamer may accumulate a large following of other users that enjoy watching the streamer play games and that identify the streamer via his service identifier.

As shown in FIG. 1, an identity interface 130 may be provided to assist the user 110 in transferring his identity from the service 120 to the resource 140. In particular, in some examples, the user 110 may issue a first request 103 to the identity interface 130 to generate and provide a temporary alternate identifier 131 to the user 110 to enable secure transfer of the user's identity from the service 120 to the resource 140. For example, in some cases, the first request 103 to the identity interface 130 may include the user's identity representation 125 (e.g., JWT token) generated by the service. The identity interface 130 may then parse the identity representation 125 to obtain the user's service identifier 101 and generate a temporary alternate identifier 131 that is temporarily associated with the user's service identifier. The temporary alternate identifier 131 may be a private identifier, for example that is not made available to other users of the service (thereby reducing the likelihood that the temporary alternate identifier may be used to impersonate the user or steal his identity). In the specific example of FIG. 1, the temporary alternate identifier 131 is a code including five letters (ABCDE). It is noted, however, that this is merely an example, and that a temporary alternate identifier 131 may include other information types, such as letters, numbers, symbols, combinations thereof, and the like, having any desired length or format. The identity interface 130 may issue a first response 104 that provides the temporary alternate identifier 131 (e.g., ABCDE) to the user 110. In addition to providing the temporary alternate identifier 131 to the user 110, the identity interface 130 may generate and store a mapping 135 that associates the temporary alternate identifier 131 (e.g., ABCDE) with the user's respective service identifier 101 (e.g., USER123). In some examples, the identity interface 130 may store and maintain a database or other data collection that includes current and valid mappings of temporary alternate identifiers to their corresponding respective service identifiers for each user for which a temporary alternate identifier has been requested and generated.

Figure 2:
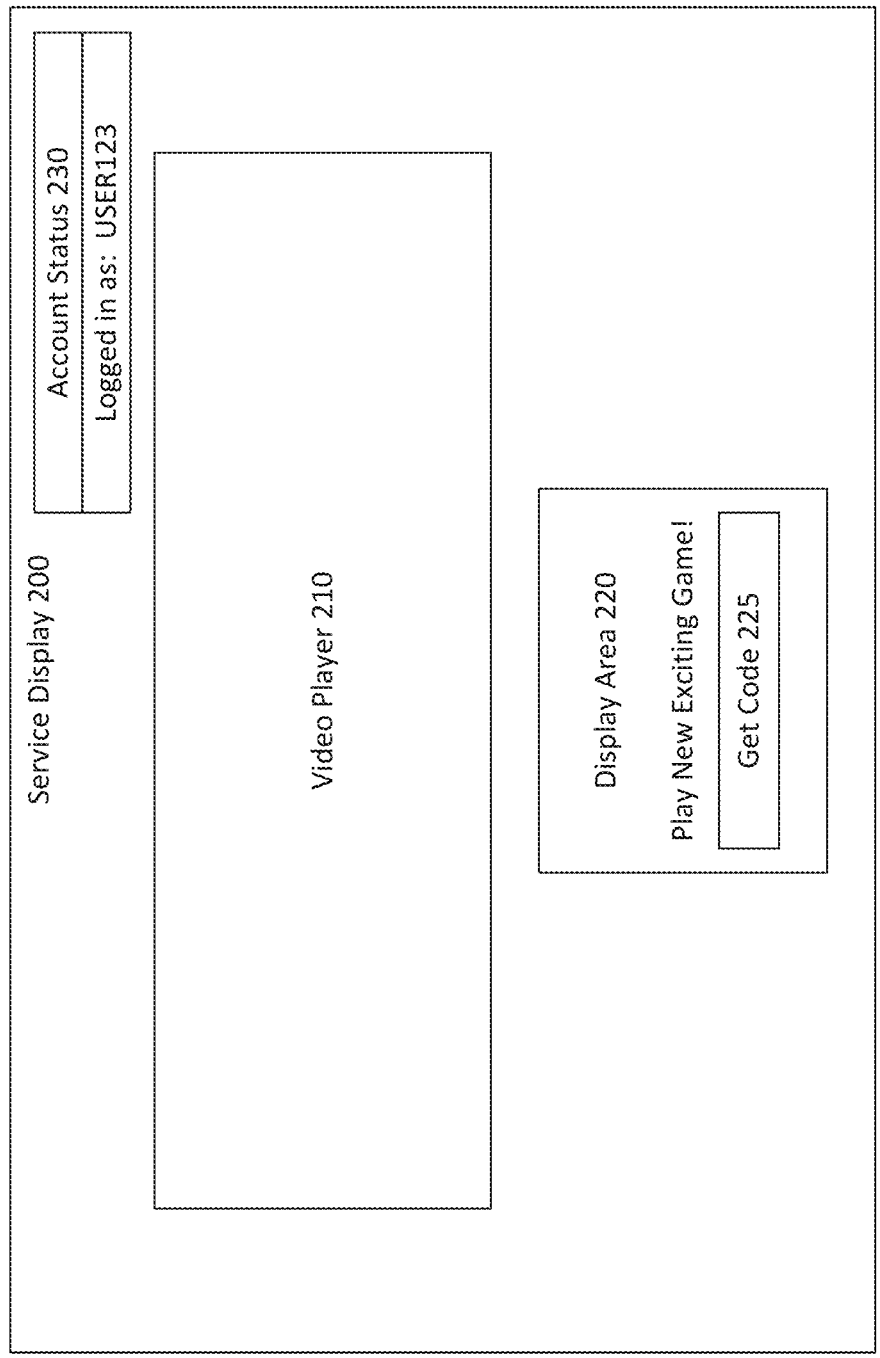
FIG. 2 is diagram illustrating an example interface for requesting a temporary alternate identifier that may be used in accordance with the present disclosure.
Figure 3:
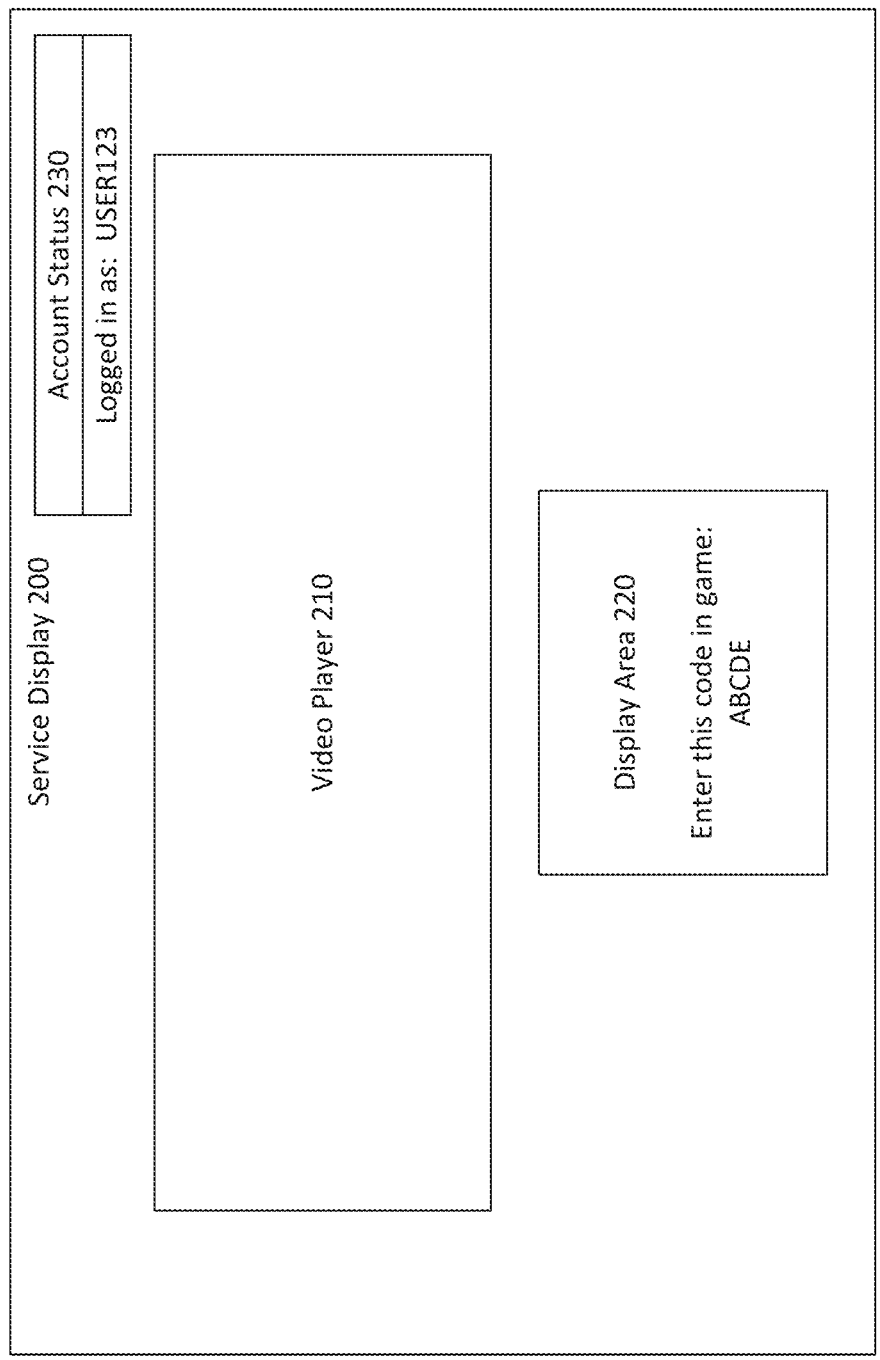
FIG. 3 is a diagram illustrating an example interfacing for returning a temporary alternate identifier that may be used in accordance with the present disclosure.

Referring now to FIGS. 2-3, some example interfaces that may be employed for requesting and receiving the temporary alternate identifier 131 will now be described in detail. In particular, FIG. 2 shows a service display 200 that may be provided, for example, to users of a video streaming service. In some examples, the service display 200 may be presented in a browser, such as via a website operated by the service 120, or via a client application provided by the service 120 and executed on the user's computing device. In the example of FIG. 2, the service display 200 includes an account status field 230 that indicates that the user 110 is logged in with his corresponding service identifier 101 (USER123). The service display 200 also includes a video player 210, such as for displaying video that is transmitted by the video streaming service and received and played on the user's device. Additionally, the service display 200 includes a display area 220 that may be activated by the user 110 to request the temporary alternate identifier 131. In this specific example, the display area 220 is an advertisement for a new video game that is being made available to the user 110. In order to advertise this new video game, the display area includes the text, "Play New Exciting Game!" The display area also includes a selectable button 225, which includes the text "Get Code." The user may select the button 225, such as by clicking on the button 225 using an attached mouse, a touchscreen, or another input device. The "Get Code" text informs the user that selecting the button 225 will cause a temporary alternate identifier 131 (referred to in this example as a code) for joining the new video game advertised in the display area 220 to be generated and displayed in the display area 220. Thus, in this example, selecting the button 225 causes a first request 103 for a temporary alternate identifier 131 for the user 110 to be issued to the identity interface 130.

Referring now to FIG. 3, the result of the user's selection of the button 225 will now be described. As described above, selection of the button 225 causes a first request 103 to be issued to the identity interface 130 to generate a temporary alternate identifier 131 for the user 110. The identify interface 130 may then generate the temporary alternate identifier 131 and return a first response 104 providing an indication of temporary alternate identifier 131 to the user 110. Upon receipt of the first response 104, the temporary alternate identifier 131 may be displayed to the user 110. Specifically, as shown in FIG. 3, after the selection of button 225, the display area 220 is modified to show the text, "Enter this code in game: ABCDE." Thus, in the example of FIG. 3, the temporary alternate identifier 131 (e.g., the code ABCDE) is displayed to the user via the display area 220. Also, in this example, the user is instructed to enter the temporary alternate identifier 131 (e.g., the code ABCDE) into the resource 140 (e.g., the video game being advertised). It is noted that the examples of FIGS. 3 and 4 merely provide some example techniques for requesting and receiving the temporary alternate identifier, and that a variety of other alternative techniques may also be employed.

Figure 4:
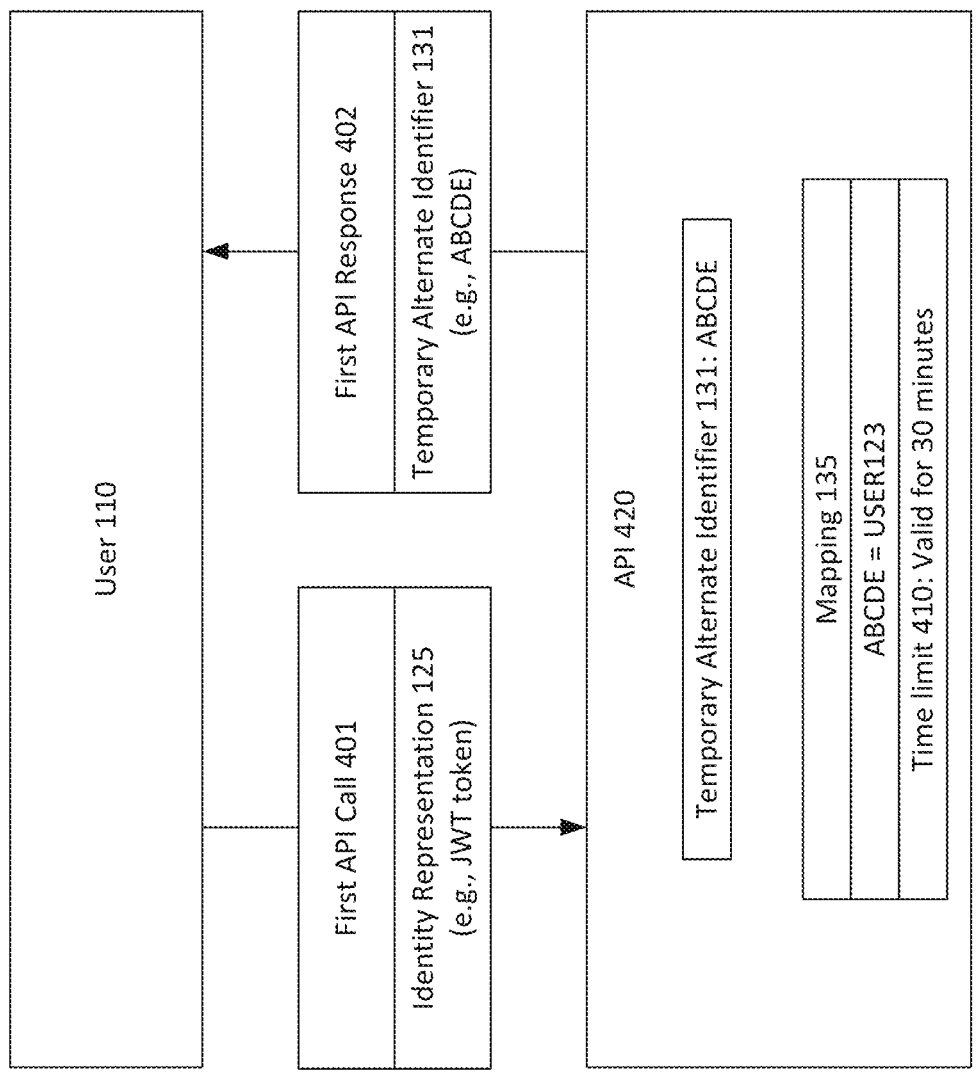
FIG. 4 is a diagram illustrating a first example application programming interface (API) call that may be used in accordance with the present disclosure.

In some examples, the identity interface 130 may expose an application programming interface (API), such as a Representational State Transfer (REST) API, and first request 103 may include an API call to the identity interface 130 to request the temporary alternate identifier 131 from the identity interface 130. In some examples, the use of a REST API may be particularly advantageous, such as because REST API's may be called from code and may be called by a wide variety of applications and components. Referring now to FIG. 4, an example is shown of an API 420 that may be exposed by the identity interface 130. In the example of FIG. 4, the first request 103 of FIG. 1 is a first API call 401 that is issued to the API 420 of the identity interface 130 on behalf of the user 110. In this example, the first API call 401 is a request for the identity interface 130 to generate and provide the temporary alternate identifier 131. Also, in this example, the first API call includes the identity representation 125 (e.g., JWT token) that is generated by the service 120 to represent the identity of the user. Upon receipt of the first API call 401, the API 420 may parse the identity representation 125 to obtain the user's service identifier 101 and generate a temporary alternate identifier 131 (e.g., ABCDE) that is temporarily associated with the user's service identifier. The API 420 may generate and store the mapping 135 that associates the temporary alternate identifier 131 (e.g., ABCDE) with the user's respective service identifier 101 (e.g., USER123). Additionally, in the example of FIG. 4, the first response 104 of FIG. 1 is a first API response 402 that returns the temporary alternate identifier 131 to the user 110.

As described above, in order to provide additional security to the user's identity, the temporary alternate identifier 131 is valid only for a limited period of time. Specifically, by limiting the time period during which the temporary alternate identifier 131 is valid, the risk that the temporary alternate identifier may be stolen or otherwise improperly obtained and used for malicious purposes (e.g., to impersonate the user 110) is reduced. For example, in some cases, the temporary alternate identifier 131 may be valid until the resource 140 requests the identity of the user associated with the temporary alternate identifier 131 (as will be described in detail below). In some examples, after the temporary alternate identifier is used once by the resource 140 (or by another resource) to obtain a user's identity, it may be invalidated such that it cannot be used again. In other examples, the temporary alternate identifier 131 may remain valid for a fixed time period after it is generated. In yet other examples, a combination of these techniques may be used.

For example, if the temporary alternate identifier is successfully used within the fixed time period to obtain the user's identity, then it may be invalidated after that one successful use, even if the time period has not yet fully expired. In the specific example of FIG. 4, the temporary alternate identifier 131 is valid for thirty minutes after it is generated, as indicated by the time limit 410. This means that if the resource 140 (or any other component) requests the identity of the user associated with the code ABCDE after this time limit has expired, the identity interface 130 may refuse to return the identity. In some cases, if the temporary alternate identifier 131 has expired and is no longer valid, the user 110 may request a new temporary alternate identifier 131, such as by repeating the process used to obtain the previous temporary alternate identifier 131.

Referring back to FIG. 1, it may be seen that the user 110 may receive the temporary alternate identifier 131 from the identify interface 130 via the first response 104. Upon receipt of the temporary alternate identifier 131 from the identity interface 130, the user 110 may then access the resource 140 and may provide an indication 105 of the temporary alternate identifier 131 (e.g., ABCDE) to the resource 140. The resource may then attempt to determine the identity of the user 110 based on the temporary alternate identifier 131. As shown in FIG. 1, to make this determination, the resource 140 may issue a second request 106 to the identity interface 130 to provide the identity (e.g., the service identifier) associated with the temporary alternate identifier 131 (e.g., ABCDE) provided to the resource 140 by the user 110 via the indication 105.

Upon receipt of the second request 106, the identify interface 130 may attempt to match the temporary alternate identifier 131 (e.g., ABCDE) received from the resource 140 with a corresponding respective service identifier. For example, as described above, the identity interface 130 may store and maintain a database or other data collection that includes current and valid mappings of temporary alternate identifiers to their corresponding respective service identifiers for each user for which a temporary alternate identifier has been requested and generated. In some examples, the identity interface 130 may search this database using the code ABCDE in order to identify and access a respective mapping 135 within the database that maps the code ABCDE to the corresponding service identifier USER123. Upon determining the service identifier 101 (e.g., USER123) that corresponds to the temporary alternate identifier (e.g., ABCDE) included in the second request 106, the identity interface 130 may issue a second response 107 to the resource that returns the corresponding service identifier 101 (e.g., USER123) for the user 110. Upon receipt of the second response 107, the resource 140 may use the returned service identifier 101 (e.g., USER123) to refer to the user within the context of the resource 140, thereby allowing the user's identity to be securely transferred from the service 120 to the resource 140. For example, if the resource 140 is a video game, a character or other virtual entity controlled by the user may be identified using the service identifier 101 (e.g., USER123).

Figure 5:
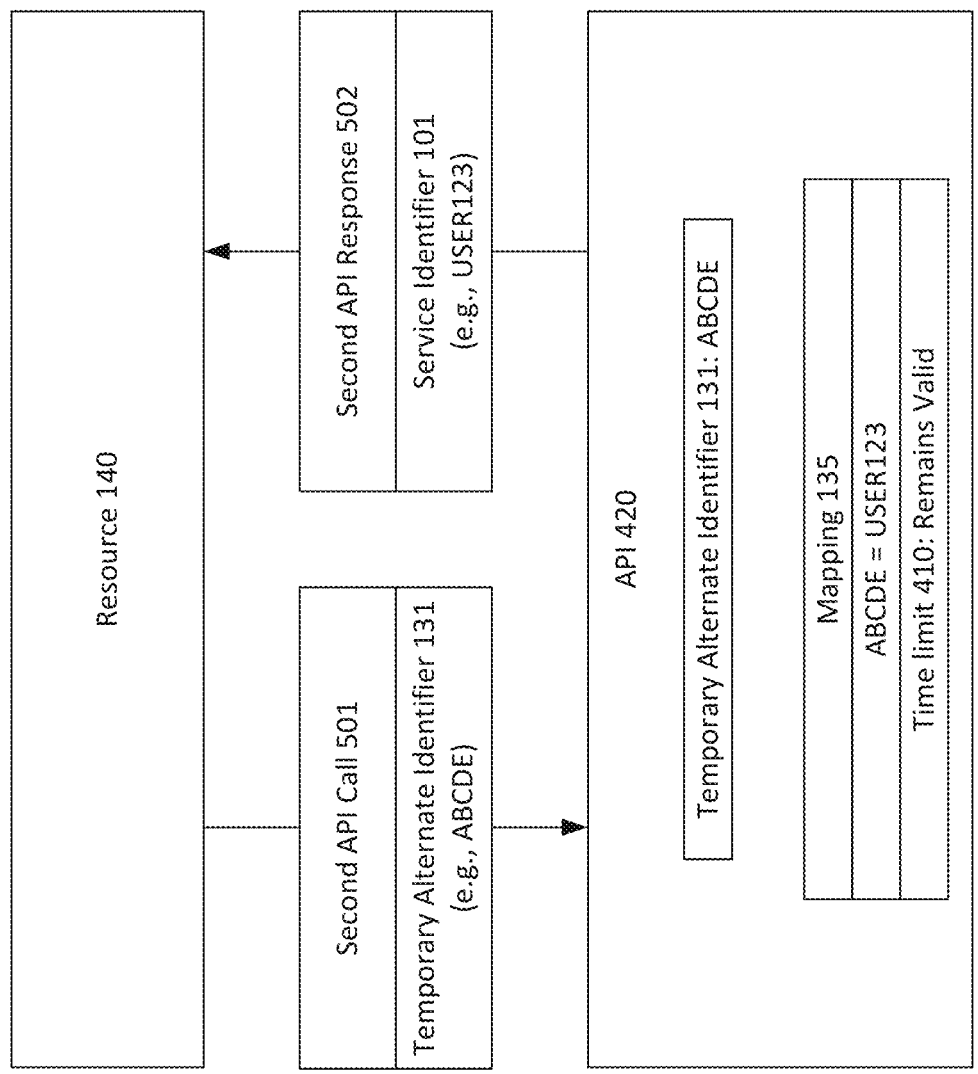
FIG. 5 is a diagram illustrating a second example application programming interface (API) call that may be used in accordance with the present disclosure.

As described above, in some examples, the identity interface 130 may expose an API, such as a REST API. Referring now to FIG. 5, an example is shown in which the second request 106 of FIG. 1 is a second API call 501 that is issued to the API 420 of the identity interface 130 by the resource 140. In this example, the second API call 501 includes the temporary alternate identifier 131 (e.g. ABCDE) provided by the user 110 to the resource 140. The second API call 501 is a request for the identity interface 130 to determine the respective service identifier associated with the temporary alternate identifier 131 that is included in the second API call 501. As described above, the identity interface 130 may search a database of mappings of temporary alternate identifiers to corresponding respective service identifiers in order to determine that the code ABCDE corresponds to the service identifier USER123. The API 420 may then generate and return a second API response 502 including the corresponding respective service identifier 101 (e.g., USER123).

In some examples, the identity interface 130 may also confirm that the temporary alternate identifier 131 is still valid, such as by examining a time limit 410 and/or other information associated with the temporary alternate identifier 131. In the example of FIG. 4, the time limit 410 indicated that the temporary alternate identifier ABCDE was set to expire thirty minutes after it had been generated. As shown in FIG. 5, the time limit 410 indicates that the temporary alternate identifier ABCDE remains valid, which in this example means that the second API call 501 is received by the identity interface 130 within thirty minutes (or less) of the time that the temporary alternate identifier ABCDE was initially generated. Thus, because the temporary alternate identifier ABCDE is still valid, the identity interface 130 successfully returns the corresponding service identifier USER123 to the resource 140. As described above, for cases in which the temporary alternate identifier 131 is no longer valid, the identity interface 130 may refuse to provide the corresponding service identifier to the resource 140. In some examples, the identity interface 130 may inform the resource 140 that the temporary alternate identifier 131 is no longer valid. Also, in some examples, the resource 140 may, in turn, inform the user 110 that the temporary alternate identifier 131 is no longer valid, and the user 110 may optionally request a new temporary alternate identifier 131 from the identity interface 130.

Figure 6:
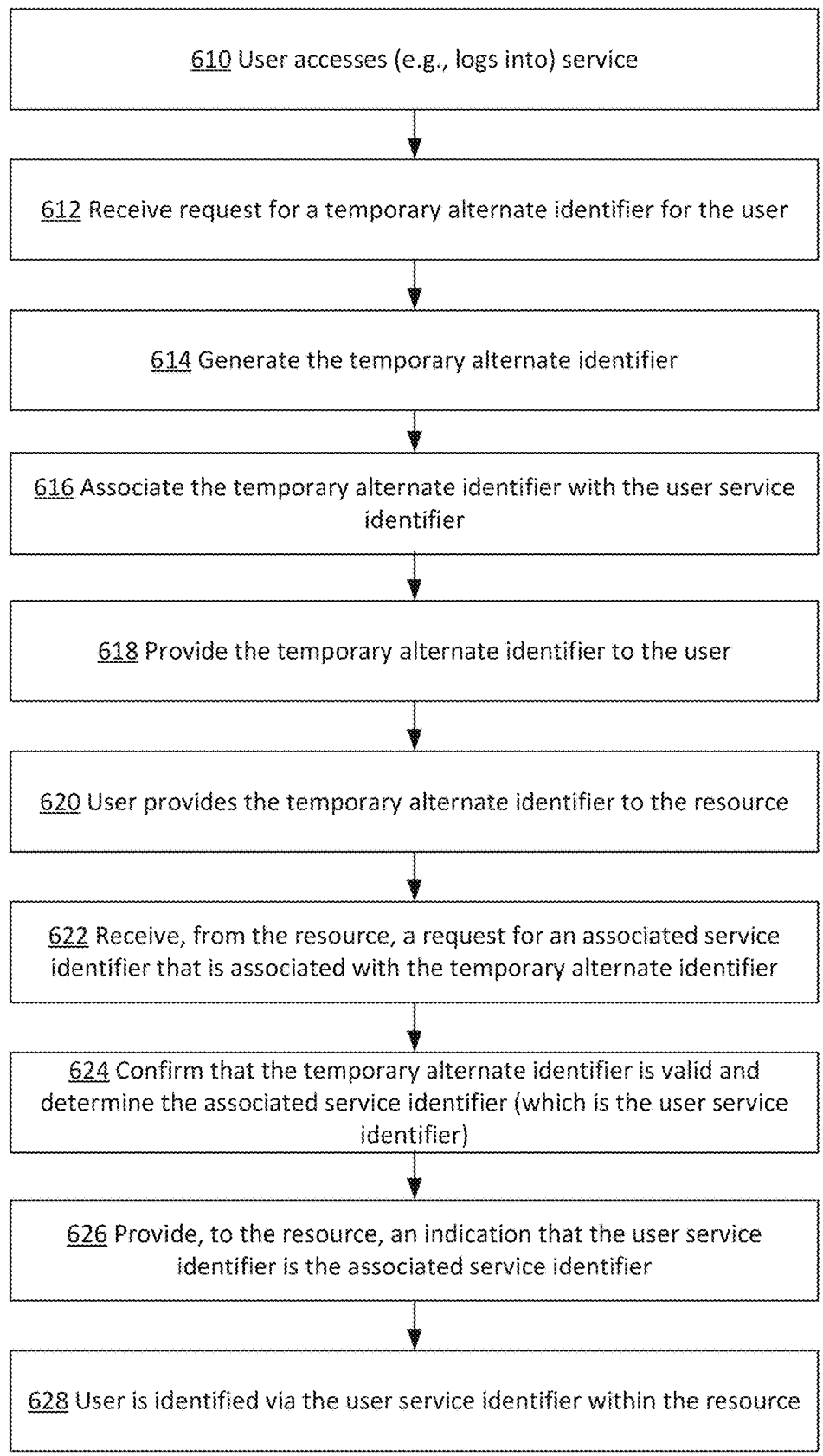
FIG. 6 is a flowchart illustrating an example process for secure identity transfer that may be used in accordance with the present disclosure.

FIG. 6 is a flowchart illustrating an example process for secure identity transfer that may be used in accordance with the present disclosure. The process of FIG. 6 is initiated at operation 610, at which a user accesses a service. In one specific example, the service may be a video streaming service, and the user may be a streamer that provides video content of himself playing various video games that is streamed by the video streaming service to viewers. The user may access the service by logging into the service, such as by providing a user service identifier (e.g., service identifier 101 of FIG. 1) in combination with corresponding verification information (e.g., verification information 102 of FIG. 1). In some examples, the user service identifier may include a username, such as USER123. Also, in some examples, the verification information may include a password, such as PASSWORD456. The user may be identified within the service using the user service identifier. The user service identifier may be a public identifier, such as may be used to identify the user to other users of the service. For example, in some cases, a streamer's channel within a video streaming service may be identified using the streamer's respective user service identifier. When the user successfully logs into or otherwise accesses the service (such as by having the service match the user service identifier to the corresponding verification information), the service may generate an identity representation for the user that represents the identity of the user. In one specific example, the identity representation may be a JavaScript Object Notation (JSON) Web Token (JWT token). In some examples, the use of JWT tokens as identity representations may be particularly advantageous because they may be particularly difficult to tamper with. However, it is noted that the identity representation may include other representations of the user's identify, such as the user service identifier itself or other representations of the user's identity.

At operation 612, a request is received for a temporary alternate identifier for the user. For example, as described above, the user may wish to transfer his identity from the service to a resource. This may allow the user to be identified within the context of the resource 140 using the same identity (e.g., the user service identifier) by which the user is identified within the context of the service. In one specific example, a streamer may wish to transfer his identity from a video streaming service to a resource such as a video game. This may allow the streamer to be identified within the video game using the same identity (e.g., the video streaming service identifier) by which the streamer is identified within the video streaming service. One reason for this is that a streamer may accumulate a large following of other users that enjoy watching the streamer play games and that identify the streamer via his service identifier. In some examples, the resource may be external to the service, for example as shown in FIG. 1. As also described above, the temporary alternate identifier may assist in transferring the user service identifier from the service to a resource. In particular, the user may issue a request (e.g., first request 103 of FIG. 1) to an identity interface to generate and provide a temporary alternate identifier to the user to enable secure transfer of the user's identity from the service to the resource. This request from the user for generation of the temporary alternate identifier may be received at operation 612 by the identity interface. For example, in some cases, the request received at operation 612 may include the user's identity representation generated by the service. In some cases, the identity representation may include a unique token (e.g., JWT token) that is employed to verify an identity of the user, and the unique token may be included in, or otherwise provided in association with, the request for the temporary alternate identifier.

As described above, in some examples, the identity interface may expose an application programming interface (API), such as a Representational State Transfer (REST) API, and the API may be called to request the temporary alternate identifier from the identity interface, for example using the first API call 401 of FIG. 4. In some examples, the use of a REST API may be particularly advantageous, such as because REST API's may be called from code and may be called by a wide variety of applications and components. Also, in some examples, a video streaming or other service may provide a display that includes a button (e.g., button 225 of FIG. 2 including the text "Get Code") or other control that may be selected to cause the request for the temporary alternate identifier to be issued.

At operation 614, the temporary alternate identifier is generated. The temporary alternate identifier may be a private identifier, for example that is not exposed to other users of the service (thereby reducing the likelihood that the temporary alternate identifier may be used to impersonate the user or steal his identity). In the specific example of FIG. 1, the temporary alternate identifier is a code including five letters (ABCDE). It is noted, however, that this is merely an example, and that a temporary alternate identifier may include other information types, such as letters, numbers, symbols, combinations thereof, and the like, having any desired length or format.

At operation 616, the temporary alternate identifier is associated with the user service identifier. For example, the identity interface may obtain the user service identifier based on the request received at operation 612. Specifically, as described above, the request received at operation 612 may include the user's identity representation (e.g., JWT token). The identity interface may parse the identity representation, if necessary, to obtain the user service identifier. The identity interface may then associate with the user service identifier with the temporary alternate identifier. For example, the identity interface may generate and store a mapping (e.g., mapping 135 of FIG. 1) that associates the temporary alternate identifier (e.g., ABCDE) with the user service identifier (e.g., USER123). In some examples, the identity interface may store and maintain a database or other data collection that includes current and valid mappings of temporary alternate identifiers to their corresponding respective service identifiers for each user for which a temporary alternate identifier has been requested and generated. As described above, in order to provide additional security to the user's identity, the temporary alternate identifier is valid only for a limited period of time. For example, in some cases, the temporary alternate identifier may be valid until a resource requests the identity of the user associated with the temporary alternate identifier. In other examples, the temporary alternate identifier may remain valid for a fixed time period (e.g., thirty minutes) after it is generated and/or after it is provided to the user.

At operation 618, the temporary alternate identifier is provided to the user. For example, the identity interface may issue a response to the user (e.g., first response 104 of FIG. 1) that provides the temporary alternate identifier (e.g., ABCDE) to the user. In some examples, the response may be an API response, such as first API response 402 of FIG. 2. The temporary alternate identifier may be displayed to the user, such as shown in display area 220 of FIG. 3, in some cases along with instructions to enter the code into the video game or other resource. At operation 620, the user provides the temporary alternate identifier to the resource such as to assist in identifying himself or herself to the resource.

At operation 622, a request is received, from the resource, for an associated service identifier that is associated with the temporary alternate identifier. For example, the resource may issue a request to the identity interface (e.g., second request 106 of FIG. 1) that includes the temporary alternate identifier and that requests an associated service identifier that is associated with the temporary alternate identifier. In some examples, an API, such as an API of the identity interface, may be called to request the associated service identifier, such as shown in second API call 501 of FIG. 5.

At operation 624, it is confirmed that the temporary alternate identifier is valid (e.g., has an associated service identifier, has not expired, etc.), and the associated service identifier is determined. For example, the identity interface may confirm that the temporary alternate identifier has not expired. In some cases, the temporary alternate identifier may remain valid until the identity interface receives a request for the identity of the user associated with the temporary alternate identifier. In some examples, after the temporary alternate identifier is used once by a resource to obtain a user's identity, it may be invalidated such that it cannot be used again. In other examples, the temporary alternate identifier may remain valid for a fixed time period after it is generated. In yet other examples, a combination of these techniques may be used. For example, if the temporary alternate identifier is successfully used within the fixed time period to obtain the user's identity, then it may be invalidated after that one successful use, even if the time period has not yet fully expired. As described above, for cases in which the temporary alternate identifier is no longer valid, the identity interface may refuse to provide the corresponding service identifier to the resource. In some examples, the identity interface may inform the resource that the temporary alternate identifier is no longer valid. Also, in some examples, the resource may, in turn, inform the user that the temporary alternate identifier is no longer valid, and the user may optionally request a new temporary alternate identifier from the identity interface.

In some examples, in addition to confirming that the temporary alternate identifier has not expired, the identity interface may perform additional validity checks, such as confirming that the temporary alternate identifier meets proper formatting requirements and/or confirming that the temporary alternate identifier has, in fact, been issued by the identity interface and can be matched with a corresponding respective service identifier. For example, as described above, the identity interface may store and maintain a database or other data collection that includes current and valid mappings of temporary alternate identifiers to their corresponding respective service identifiers for each user for which a temporary alternate identifier has been requested and generated. In some examples, the identity interface may search this database using the code ABCDE in order to identify and access a respective mapping within the database that maps the code ABCDE to the associated service identifier (e.g., USER123).

At operation 626, an indication is provided, to the resource, that the user service identifier is the associated service identifier. For example, upon determining the service identifier (e.g., USER123) that corresponds to the temporary alternate identifier (e.g., ABCDE) included in the second request from the resource, the identity interface may issue a response to the resource (e.g., second response 107 of FIG. 1) that returns the associated service identifier, which in this case is the user service identifier (e.g., USER123). This response may be an API response, such as second API response 502 of FIG. 5. At operation 628, the user is identified via the user service identifier within the resource, thereby allowing the user's identity to be securely transferred from the service to the resource. For example, if the resource is a video game, a character or other virtual entity controlled by the user may be identified using the user service identifier (e.g., USER123). It is noted that, even after the user service identifier is transferred to the resource (and used to identify the user within the context of the resource), the user service identifier may also continue to be used by the user in the service and to identify the user within the context if the service.

In some examples, a visual verification may be provided, within the resource, that indicates that the user service identifier has been securely transferred from the service to the resource. This visual verification may confirm, to other users of the resource, that the user that is employing the user service identifier within the resource is, in fact, the same user to which the user service identifier has been assigned and authorized (for example as opposed to an imposter that is attempting to steal the user's identity). For example, in some cases, if the resource is a video game, the visual verification may be displayed adjacent to a character that is being controlled by the user. Additionally, if the user service identifier is listed in video game statistics for the resource, the visual verification may be displayed adjacent to the listing of the user service identifier within those statistics. In some examples, the visual verification may include an icon (e.g., a checkmark, thumbs-up, etc.), text (e.g., the words "identity verified", etc.), and/or other types of visual verifications.

Thus, as described above with reference to FIG. 6, the temporary alternate identifier-based techniques described herein may, in some examples, be employed to securely transfer a user's identity. In some other examples, however, rather than transferring a user's identity, it may instead be desirable to bind user identities, such as by binding a user service identifier to a user resource identifier. As will be described in detail below, the temporary alternate identifier-based techniques described herein may also be employed to securely bind user identities. In some examples, user identity binding may be desirable for scenarios in which it is advantageous to link information corresponding to the user resource identifier with the user service identifier. One such scenario may occur in the context of video games, such as when the resource is a video game in which video game statistics may be generated for the user corresponding to the user's activity within the resource, such as points scored, wins, losses, inventory acquired, levels completed, kills made, punches landed, and the like. In some examples, it may be desirable to link video game statistics for the user from the resource with the user's service identifier. For example, in some cases, it may be desirable to link video game statistics for the user from the resource with video game statistics that may employ the user service identifier, such as leader boards, player rankings, and many other game statistics. In some examples, the user may be identified by his or her respective user service identifier within the statistics that are maintained by the identity interface, by the service, and/or by other entities. Thus, in order to assist in integrating the user's statistics from the resource with the user's statistics that employ the user service identifier, it may be helpful to bind the user's service identifier with the user's resource identifier.

Figure 7:
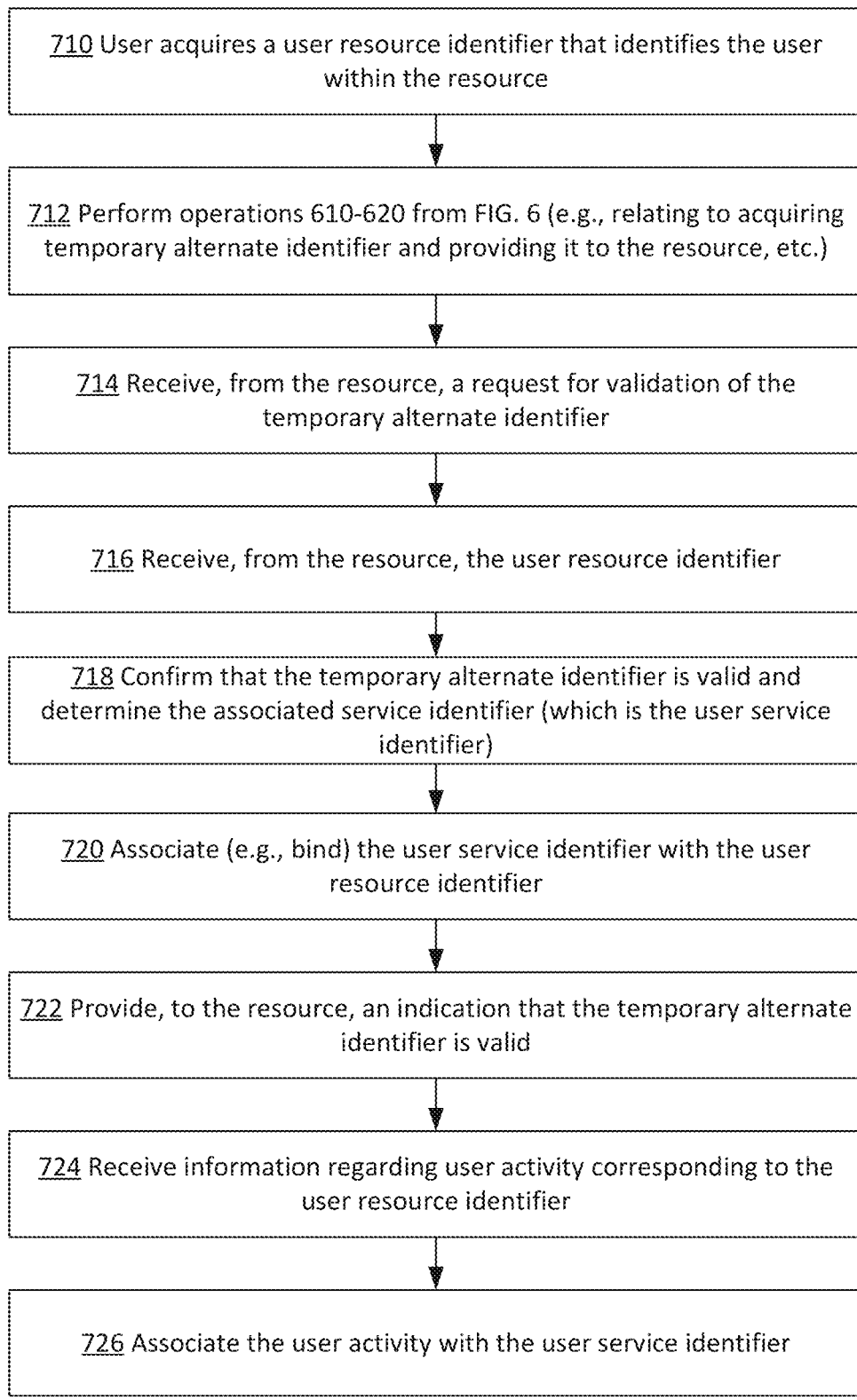
FIG. 7 is a flowchart illustrating an example process for secure identity binding that may be used in accordance with the present disclosure.

FIG. 7 is a flowchart illustrating an example process for secure identity binding that may be used in accordance with the present disclosure. The process of FIG. 7 is initiated at operation 710, at which a user resource identifier is acquired by the user. As described above, the user resource identifier identifies the user within the resource. As also described above, the user may also have a user service identifier that identifies the user within the service, and the user resource identifier may be different from the user service identifier. In one specific example, the user service identifier might be USER123, while the user resource identifier might be PLAYER456. Additionally, in one specific example, the resource may be a video game, and the user resource identifier may be acquired by the user when the user registers for a video game tournament in which the video game is being played.

At operation 712, a performance of operations 610-620 from FIG. 6 may be made. For example, the user may determine that he or she would like the user service identifier to be associated (e.g., bound) with the user resource identifier. As described above, this may sometimes occur when the user desires for video game statistics from the resource to be linked the user service identifier within the service. As should be appreciated, many other example reasons may also persuade the user to cause the user service identifier to be associated (e.g., bound) with the user resource identifier. As described above, the temporary alternate identifier may assist in associating (e.g., binding) the user service identifier with the user resource identifier. Thus, as part of operation 712, the user may login to the service and request generation of the temporary alternate identifier. The temporary alternate identifier may be generated and associated with the user service identifier and provided to user. The user may then, in turn, provide the temporary alternate identifier to the resource. Each of these operations is described in detail above with reference to operations 610-620 of FIG. 6, and these descriptions are not repeated here.

At operation 714, a request is received, from the resource, for validation of the temporary alternate identifier. For example, the resource may issue a request to the identity interface that includes the temporary alternate identifier and that requests validation of the temporary alternate identifier. In some examples, an API, such as an API of the identity interface, may be called to request validation of the temporary alternate identifier.

At operation 716, the user resource identifier (e.g., PLAYER456) is received from the resource. In some examples, the user resource identifier may be received by the identity interface, and the resource may provide an indication that the user resource identifier is linked to the temporary alternate identifier received at operation 714. For example, in some cases, the user resource identifier may be received from the resource within the same API call/request for validation of the temporary alternate identifier that is received at operation 714. By including the user resource identifier along with the temporary alternate identifier in the same API call or request, the resource may indicate to the identity interface that the user resource identifier and the temporary alternate identifier are linked and related to one another.

At operation 718, it is confirmed that the temporary alternate identifier is valid (e.g., has an associated service identifier, has not expired, etc.), and the associated service identifier is determined. It is noted that operation 718 corresponds to operation 624 of FIG. 6—and is therefore described in detail above with reference to the description of operation 624. This description is not repeated here.

At operation 720, the user service identifier is associated (e.g., bound) with the user resource identifier. For example, as described above, the resource may provide an indication to the identity interface that the user resource identifier (provided at operation 716) is linked to the temporary alternate identifier, such as by including the user resource identifier in the request to validate the temporary alternate identifier (received at operation 714). As also described above, the identity interface may associate the temporary alternate identifier with the user service identifier (e.g., at operation 712 via operation 616), for example based on mapping 135 of FIG. 1. Thus, the identity interface may determine that both the user service identifier (e.g., USER123) and the user resource identifier (e.g., PLAYER 456) are linked to the same temporary alternate identifier (e.g., ABCDE). Based on this determination, the identity interface may then associate (e.g., bind) the user service identifier (e.g., USER123) with the user resource identifier (e.g., PLAYER 456). For example, the identity interface may generate and store a record linking the user service identifier (e.g., USER123) and the user resource identifier (e.g., PLAYER456) within the mapping 135 or in another mapping or record.

At operation 722, an indication is provided to the resource that the temporary alternate identifier is valid. In some examples, this indication may be provided as an API response from the identity interface. In some cases, the identity interface may provide a textual response (e.g., the word "valid") and/or a code, symbol, or other type of response that indicates that the temporary alternate identifier is valid. Also, in some cases, the identity interface may return the user service identifier (such as described at operation 626), and this may indicate to the resource that the temporary alternate identifier is valid.

At operation 724, information is received regarding user activity corresponding to the user resource identifier. In some examples, the resource may be a video game, and the information regarding user activity may include video game statistics corresponding to the user, such as points scored, wins, losses, inventory acquired, levels completed, kills made, punches landed, and the like. In other examples, the information regarding user activity may include other information about the user's actions and/or performance within the resource. In some cases, the information may be provided by the resource and received by the service (in some cases via the identity interface as an intermediary). In some examples, the information may be received at periodic intervals and/or in response to specified events (e.g., winning a battle, completing a mission, etc.). Also, in some examples, the validation of the temporary alternate identifier may serve to trigger the resource to provide the information to the identity interface and/or the service.

At operation 726, the user activity is associated with the user service identifier. In some examples, operation 726 may be performed by the service and/or by the identity interface. As described above, it may sometimes be desirable to link video game statistics for the user from the resource with the user's service identifier. For example, in some cases, it may be desirable to link video game statistics for the user from the resource with video game statistics that may employ the user service identifier, such as leader boards, player rankings, and many other game statistics. In some examples, the user may be identified by his or her respective user service identifier within the statistics that are maintained by the identity interface, by the service, and/or by other entities. Thus, in order to assist in integrating the user's statistics from the resource with the user's statistics that employ the user service identifier, it may be helpful to bind the user's service identifier with the user's resource identifier. In one specific example, points acquired by the user when playing the resource (while being identified via the user resource identifier) may be added to a leader board that identifies the user via the user service identifier.

Figure 8:
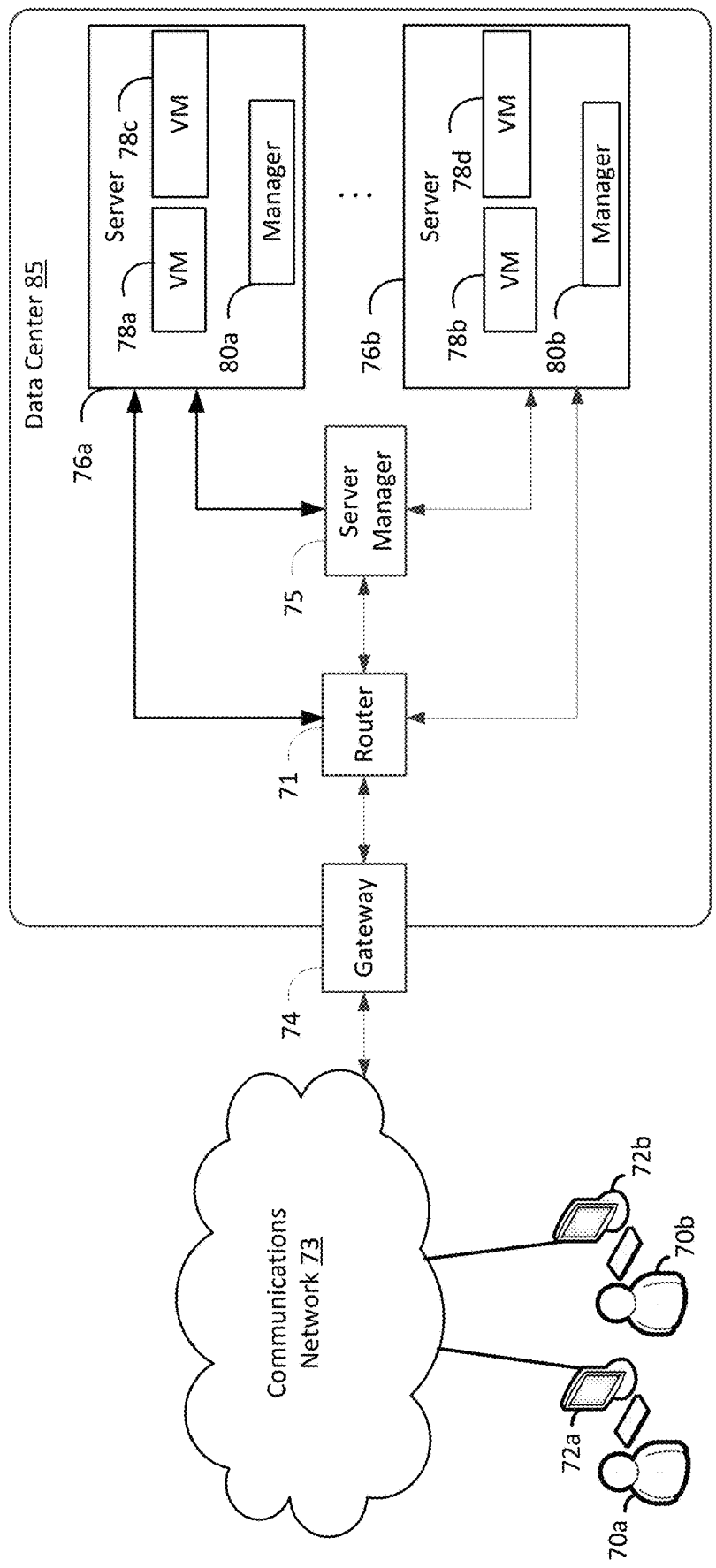
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
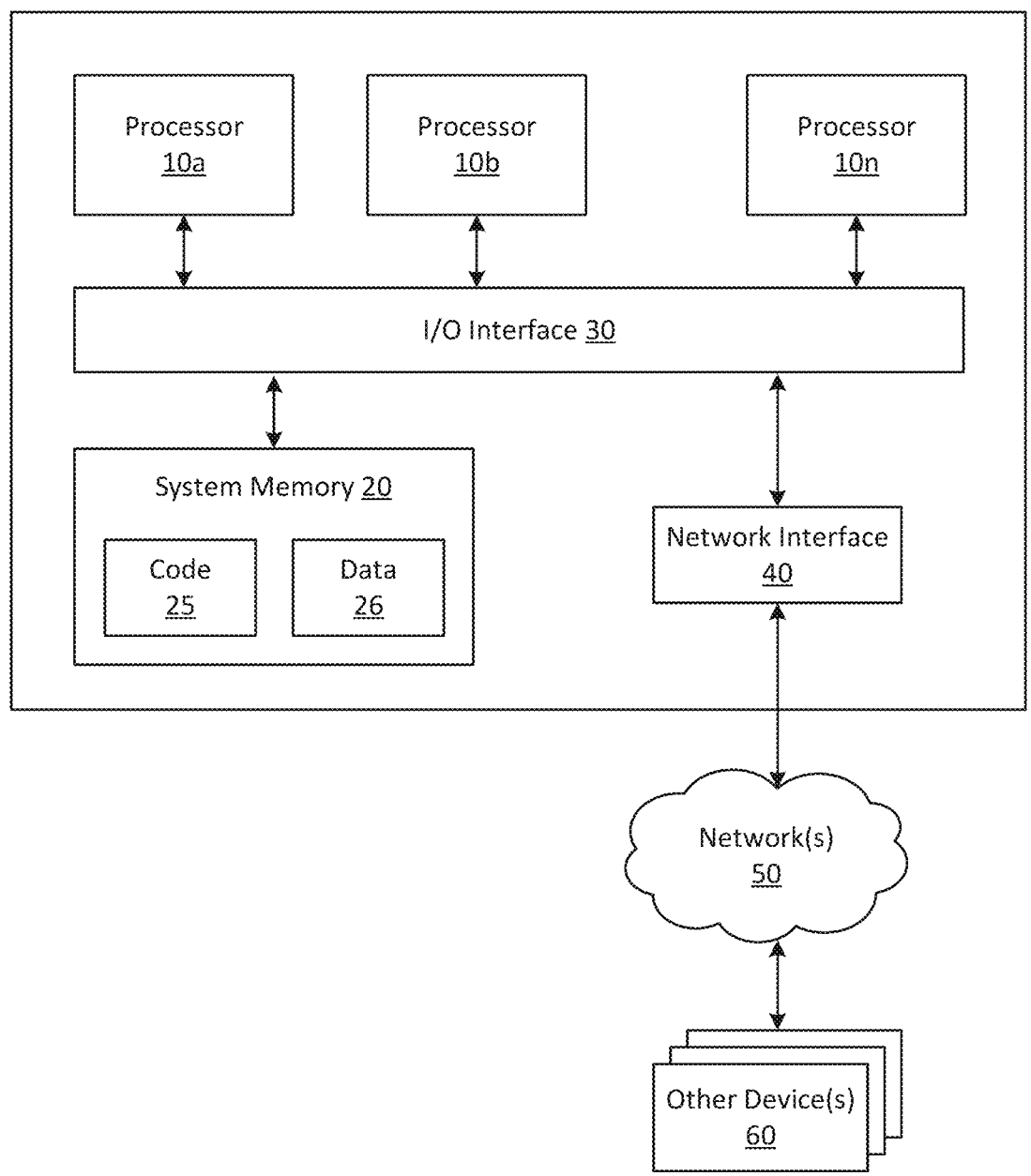
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
receiving a first request for generation of a temporary alternate identifier for a user, wherein the user is identified using a user service identifier within a video streaming service that streams game video provided by the user, and wherein the temporary alternate identifier assists in binding the user service identifier with a user resource identifier that identifies the user within a video game;
generating the temporary alternate identifier;
associating the temporary alternate identifier with the user service identifier;
providing the temporary alternate identifier to the user, wherein the temporary alternate identifier is provided by the user to the video game;
receiving, from the video game, a second request for validation of the temporary alternate identifier;
receiving, from the video game, the user resource identifier;
binding the user service identifier with the user resource identifier;
providing, to the video game, an indication that the temporary alternate identifier is valid;
receiving information regarding user video game activity corresponding to the user resource identifier; and
associating the user activity with the user service identifier.

2. The computing system of claim 1, wherein the information regarding user activity comprises video game statistics corresponding to the user.

3. The computing system of claim 1, wherein the resource identifier is received from the video game as part of the second request.

4. The computing system of claim 1, wherein an application programming interface is called to request generation of the temporary alternate identifier and to request validation of the temporary alternate identifier.

5. A computer-implemented method comprising:
receiving a first request for generation of a temporary alternate identifier for a user, wherein the user is identified using a user service identifier within a video streaming service that streams game video provided by the user, and wherein the temporary alternate identifier assists in associating the user service identifier with a user resource identifier that identifies the user within a video game;
generating the temporary alternate identifier;
associating the temporary alternate identifier with the user service identifier;
providing the temporary alternate identifier to the user, wherein the temporary alternate identifier is provided by the user to the video game;
receiving, from the video game, a second request for validation of the temporary alternate identifier;
receiving, from the video game, the user resource identifier;

associating the user service identifier with the user resource identifier; and providing, to the video game, an indication that the temporary alternate identifier is valid.

6. The computer-implemented method of claim 5, further comprising:

receiving information regarding user activity corresponding to the user resource identifier; and associating the user activity with the user service identifier.

7. The computer-implemented method of claim 6, wherein the information regarding user activity comprises video game statistics corresponding to the user.

8. The computer-implemented method of claim 5, wherein the user service identifier is a public identifier used to identify the user to other users of the video streaming service.

9. The computer-implemented method of claim 8, wherein the temporary alternate identifier is a private identifier that is not exposed to the other users of the video streaming service.

10. The computer-implemented method of claim 5, wherein the video game is external to the video streaming service.

11. The computer-implemented method of claim 5, wherein the resource identifier is received from the video game as part of the second request.

12. The computer-implemented method of claim 5, wherein a unique token is employed to verify an identity of the user, and wherein the unique token is provided in association with the first request.

13. The computer-implemented method of claim 5, wherein an application programming interface is called to request generation of the temporary alternate identifier and to request validation of the temporary alternate identifier.

14. One or more non-transitory computer-readable storage media having stored thereon computing instructions that, upon execution by a computing device, cause the computing device to perform operations comprising:

receiving a first request for generation of a temporary alternate identifier for a user, wherein the user is identified using a user service identifier within a video streaming service that streams game video provided by the user, and wherein the temporary alternate identifier assists in associating the user service identifier with a user resource identifier that identifies the user within a video game;

generating the temporary alternate identifier;

associating the temporary alternate identifier with the user service identifier;

providing the temporary alternate identifier to the user, wherein the temporary alternate identifier is provided by the user to the video game;

receiving, from the video game, a second request for validation of the temporary alternate identifier;

receiving, from the video game, the user resource identifier;

associating the user service identifier with the user resource identifier; and providing, to the video game, an indication that the temporary alternate identifier is valid.

15. The one or more non-transitory computer-readable storage media of claim 14, wherein the operations further comprise:

receiving information regarding user activity corresponding to the user resource identifier; and associating the user activity with the user service identifier.

16. The one or more non-transitory computer-readable storage media of claim 15, wherein the information regarding user activity comprises video game statistics corresponding to the user.

17. The one or more non-transitory computer-readable storage media of claim 14, wherein the user service identifier is a public identifier used to identify the user to other users of the video streaming service.

18. The one or more non-transitory computer-readable storage media of claim 17, wherein the temporary alternate identifier is a private identifier that is not exposed to the other users of the video streaming service.

19. The one or more non-transitory computer-readable storage media of claim 14, wherein a unique token is employed to verify an identity of the user, and wherein the unique token is provided in association with the first request.

20. The one or more non-transitory computer-readable storage media of claim 14, wherein an application programming interface is called to request generation of the temporary alternate identifier and to request validation of the temporary alternate identifier.

* * * * *